United States Patent
Bergsten et al.

(10) Patent No.: US 7,691,760 B2
(45) Date of Patent: Apr. 6, 2010

(54) WIPE

(75) Inventors: Ronald E. Bergsten, Minneapolis, MN (US); John L. Erickson, White Bear Lake, MN (US); Daneeta L. Erickson, legal representative, White Bear Lake, MN (US); Thomas E. Haskett, Oakdale, MN (US); Michele H. Pollock, Inver Grove Heights, MN (US); Yasuo Sudo, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 11/361,875

(22) Filed: Feb. 24, 2006

(65) Prior Publication Data

US 2006/0141881 A1 Jun. 29, 2006

Related U.S. Application Data

(63) Continuation of application No. 10/093,792, filed on Mar. 8, 2002, now abandoned.

(51) Int. Cl.
*B32B 27/04* (2006.01)
(52) U.S. Cl. .................. 442/149; 15/208; 15/209.1; 15/230.12; 428/103; 428/156; 428/163; 428/195.1; 428/343; 442/151
(58) Field of Classification Search ............. 15/208, 15/209.1, 230.12; 442/151, 149; 428/103, 428/163, 195.1, 156, 343
See application file for complete search history.

(56) References Cited

U.S. PATENT DOCUMENTS

| D50,686 | S | 5/1917 | Hatch |
| D133,264 | S | 8/1942 | Perkins |
| 2,325,903 | A | 8/1943 | Blair et al. |
| D161,221 | S | 12/1950 | Walther |
| D172,703 | S | 7/1954 | Bull |
| 2,957,512 | A | 10/1960 | Wade et al. |
| 3,025,199 | A | 3/1962 | Harwood |
| 3,033,721 | A | 5/1962 | Kalwaites |
| 3,047,444 | A | 7/1962 | Harwood |
| 3,208,093 | A | 9/1965 | Hansen |
| 3,424,643 | A * | 1/1969 | Lewis, Jr. et al. ........... 428/109 |
| 3,485,706 | A | 12/1969 | Evans |

(Continued)

FOREIGN PATENT DOCUMENTS

CA 1189296 6/1985

(Continued)

OTHER PUBLICATIONS

Handbook of Pressure Sensitive Adhesive Technology, Second Edition, chapter 13 (D. Satas editor, Van Nostrand Reinhold publisher, N.Y., 1989).

(Continued)

*Primary Examiner*—Andrew T Piziali
*Assistant Examiner*—Peter Y Choi
(74) *Attorney, Agent, or Firm*—Trisha D. Adamson (57) ABSTRACT

A wipe is provided that includes a first wiping member bonded to a backing member along valleys, whereby the wiping member includes a plurality of discrete peaks, and an adhesive is provided, in one embodiment, in the valleys and not on the peaks.

10 Claims, 5 Drawing Sheets

U.S. PATENT DOCUMENTS

| | | | |
|---|---|---|---|
| 3,494,821 A | 2/1970 | Evans | |
| 3,575,764 A | 4/1971 | McFarren | |
| 3,597,299 A | 8/1971 | Thomas et al. | |
| 3,616,157 A | 10/1971 | Smith | |
| 3,619,251 A | 11/1971 | Stiles, Sr. | |
| 3,629,047 A | 12/1971 | Davison | |
| 3,658,578 A | 4/1972 | Bennett | |
| 3,673,060 A | 6/1972 | Murphy et al. | |
| 3,687,754 A | 8/1972 | Stumpf | |
| 3,687,797 A | 8/1972 | Wideman | |
| 3,695,985 A | 10/1972 | Brock et al. | |
| 3,708,361 A | 1/1973 | Stumpf | |
| 3,755,062 A | 8/1973 | Schirmer | |
| 3,775,231 A | 11/1973 | Thomas | |
| 3,780,392 A | 12/1973 | Lester | |
| 3,794,537 A | 2/1974 | Rahmes | |
| 3,953,638 A * | 4/1976 | Kemp | 428/154 |
| 3,965,518 A | 6/1976 | Muoio | |
| 3,965,519 A | 6/1976 | Hermann | |
| 4,001,472 A | 1/1977 | Thomas et al. | |
| 4,064,061 A | 12/1977 | Henry | |
| 4,097,638 A | 6/1978 | Videen | |
| 4,144,370 A | 3/1979 | Boulton | |
| 4,188,447 A | 2/1980 | Ehlenz | |
| 4,207,367 A | 6/1980 | Baker, Jr. | |
| 4,239,792 A | 12/1980 | Ludwa | |
| 4,342,314 A | 8/1982 | Radel et al. | |
| 4,355,425 A | 10/1982 | Jones et al. | |
| 4,412,879 A | 11/1983 | Ottaviano | |
| 4,418,123 A | 11/1983 | Bunnelle et al. | |
| 4,426,417 A | 1/1984 | Meitner et al. | |
| 4,436,780 A | 3/1984 | Hotchkiss et al. | |
| 4,522,863 A | 6/1985 | Keck et al. | |
| 4,543,099 A | 9/1985 | Bunnelle et al. | |
| 4,600,620 A | 7/1986 | Lloyd et al. | |
| 4,606,964 A | 8/1986 | Wideman | |
| 4,609,518 A | 9/1986 | Curro et al. | |
| D287,433 S | 12/1986 | Ellers | |
| 4,634,621 A | 1/1987 | Manning et al. | |
| 4,636,419 A | 1/1987 | Madsen et al. | |
| 4,636,429 A | 1/1987 | Morell et al. | |
| 4,637,949 A | 1/1987 | Manning et al. | |
| 4,666,621 A | 5/1987 | Clark et al. | |
| 4,683,001 A | 7/1987 | Floyd et al. | |
| 4,704,321 A | 11/1987 | Zafiroglu | |
| 4,731,276 A | 3/1988 | Manning et al. | |
| 4,737,559 A | 4/1988 | Kellen et al. | |
| 4,741,944 A | 5/1988 | Jackson et al. | |
| 4,769,265 A | 9/1988 | Coburn, Jr. | |
| 4,772,501 A | 9/1988 | Johnson et al. | |
| 4,773,238 A | 9/1988 | Zafiroglu | |
| 4,778,644 A | 10/1988 | Curro et al. | |
| 4,781,966 A | 11/1988 | Taylor | |
| 4,808,467 A | 2/1989 | Suskind et al. | |
| 4,820,579 A | 4/1989 | Aszman | |
| D301,088 S | 5/1989 | Kawaguchi | |
| 4,880,682 A | 11/1989 | Hazelton et al. | |
| 4,891,258 A | 1/1990 | Fahrenkrug | |
| 4,904,524 A | 2/1990 | Yoh | |
| 4,941,995 A | 7/1990 | Richards | |
| 4,946,617 A | 8/1990 | Sheridan et al. | |
| 4,948,653 A | 8/1990 | Dinter et al. | |
| 4,987,632 A | 1/1991 | Rowe et al. | |
| 5,057,366 A | 10/1991 | Husman et al. | |
| 5,065,887 A | 11/1991 | Schuh et al. | |
| 5,093,190 A | 3/1992 | Kwok et al. | |
| 5,098,764 A | 3/1992 | Bassett et al. | |
| 5,144,729 A | 9/1992 | Austin et al. | |
| 5,165,979 A | 11/1992 | Watkins et al. | |
| 5,198,292 A | 3/1993 | Lerner et al. | |
| 5,198,293 A | 3/1993 | Metrick | |
| 5,203,186 A | 4/1993 | Zafiroglu | |
| 5,227,228 A | 7/1993 | Newell | |
| 5,256,231 A | 10/1993 | Gorman et al. | |
| D341,944 S | 12/1993 | Peter | |
| 5,275,700 A | 1/1994 | Trokhan | |
| 5,277,761 A | 1/1994 | VanPhan et al. | |
| 5,280,664 A | 1/1994 | Lin | |
| 5,281,461 A | 1/1994 | Greenway et al. | |
| 5,292,582 A | 3/1994 | Gibbs et al. | |
| 5,310,590 A | 5/1994 | Tochacek et al. | |
| 5,334,446 A | 8/1994 | Quantrille et al. | |
| 5,342,436 A | 8/1994 | Thrasher | |
| 5,369,858 A | 12/1994 | Gilmore et al. | |
| 5,464,096 A | 11/1995 | Hurwitz | |
| 5,470,648 A | 11/1995 | Pearlman et al. | |
| 5,478,412 A | 12/1995 | Simon et al. | |
| 5,503,908 A * | 4/1996 | Faass | 428/198 |
| D370,127 S | 5/1996 | Bonaddio et al. | |
| 5,525,397 A | 6/1996 | Shizuno et al. | |
| 5,536,555 A | 7/1996 | Zelazoski et al. | |
| 5,576,090 A | 11/1996 | Suzuki | |
| 5,591,239 A | 1/1997 | Larson et al. | |
| 5,595,567 A | 1/1997 | King et al. | |
| 5,599,550 A | 2/1997 | Kohlruss et al. | |
| 5,611,791 A | 3/1997 | Gorman et al. | |
| 5,616,394 A | 4/1997 | Gorman et al. | |
| 5,618,610 A | 4/1997 | Tomita et al. | |
| 5,620,779 A | 4/1997 | Levy et al. | |
| 5,643,397 A | 7/1997 | Gorman et al. | |
| 5,662,758 A | 9/1997 | Hamilton et al. | |
| 5,674,591 A | 10/1997 | James et al. | |
| 5,681,302 A | 10/1997 | Melbye et al. | |
| 5,683,787 A | 11/1997 | Boich et al. | |
| 5,756,112 A | 5/1998 | Mackey | |
| 5,769,993 A | 6/1998 | Baldauf | |
| 5,830,558 A | 11/1998 | Barnholtz | |
| 5,843,279 A | 12/1998 | Phan et al. | |
| 5,871,607 A | 2/1999 | Hamilton et al. | |
| 5,874,159 A | 2/1999 | Cruise et al. | |
| 5,876,141 A | 3/1999 | Hsu | |
| 5,895,623 A | 4/1999 | Trokhan et al. | |
| 5,904,793 A | 5/1999 | Gorman et al. | |
| 5,918,342 A | 7/1999 | Smith et al. | |
| 5,965,235 A | 10/1999 | McGuire et al. | |
| 6,087,279 A | 7/2000 | Laun | |
| D429,589 S | 8/2000 | Denney | |
| 6,117,525 A | 9/2000 | Trokhan et al. | |
| 6,193,918 B1 | 2/2001 | McGuire et al. | |
| 6,194,062 B1 * | 2/2001 | Hamilton et al. | 428/343 |
| 6,197,404 B1 | 3/2001 | Varona | |
| 6,254,965 B1 | 7/2001 | McGuire et al. | |
| 6,314,627 B1 | 11/2001 | Ngai | |
| D454,433 S | 3/2002 | Peter | |
| 6,489,022 B1 | 12/2002 | Hamilton et al. | |
| 6,550,092 B1 | 4/2003 | Brown et al. | |
| D478,494 S | 8/2003 | Arnold | |
| 6,602,454 B2 | 8/2003 | McGuire et al. | |
| 6,602,580 B1 | 8/2003 | Hamilton et al. | |
| 2001/0051479 A1 | 12/2001 | Fereshtehkhou et al. | |
| 2001/0055926 A1 | 12/2001 | Fereshtehkhou et al. | |
| 2003/0003831 A1 | 1/2003 | Childs et al. | |
| 2003/0003832 A1 | 1/2003 | Childs et al. | |
| 2003/0171051 A1 | 9/2003 | Bergsten et al. | |

FOREIGN PATENT DOCUMENTS

| | | |
|---|---|---|
| CA | 2016288 | 11/1990 |
| CA | 2038754 | 11/1991 |
| CA | 2156958 | 3/1996 |
| DE | 92 02 836 | 6/1992 |
| EP | 0 032 793 B1 | 7/1981 |
| EP | 0 084 963 B1 | 8/1983 |
| EP | 0 178 812 B1 | 4/1986 |

| | | |
|---|---|---|
| EP | 0 211 773 A2 | 2/1987 |
| EP | 0 341 993 B1 | 11/1989 |
| EP | 0 357 496 B1 | 3/1990 |
| EP | 0 428 024 A2 | 5/1991 |
| EP | 0 452 727 B2 | 10/1991 |
| EP | 696 432 B1 | 2/1996 |
| EP | 0 447 229 A2 | 5/1997 |
| EP | 0 774 229 B1 | 5/1997 |
| EP | 0 777 997 B1 | 6/1997 |
| EP | 0 872 206 B1 | 10/1998 |
| EP | 1 064 900 B1 | 1/2001 |
| EP | 1 106 136 A1 | 6/2001 |
| GB | 948614 A | 2/1964 |
| GB | 1 331 817 | 9/1973 |
| GB | 1 454 403 A | 11/1976 |
| GB | 2 031 039 | 4/1980 |
| JP | 9-220191 | 8/1977 |
| JP | 3-48981 | 10/1988 |
| JP | 04-288113 A | 10/1992 |
| JP | 04-297215 A | 10/1992 |
| JP | 04-312430 A | 11/1992 |
| JP | 05-025763 | 2/1993 |
| JP | 05-056902 A | 3/1993 |
| JP | 05-093350 | 4/1993 |
| JP | 05-192285 | 8/1993 |
| JP | 05-245090 A | 9/1993 |
| JP | 06-014859 A | 1/1994 |
| JP | 06-017361 | 1/1994 |
| JP | 06-311954 A | 11/1994 |
| JP | 8-238204 | 9/1996 |
| JP | 08-243065 A | 9/1996 |
| JP | 9-164110 | 6/1997 |
| JP | 9-224895 | 9/1997 |
| JP | 9-224901 | 9/1997 |
| JP | 10-005164 A | 1/1998 |
| JP | 10-127547 A | 5/1998 |
| JP | 11-128156 | 5/1999 |
| JP | 11-137503 | 5/1999 |
| JP | 11-253382 | 9/1999 |
| JP | 11-313792 | 11/1999 |
| JP | 200034659 A | 2/2000 |
| JP | 200034663 A | 2/2000 |
| JP | 2000210238 A | 8/2000 |
| JP | 3231993 | 9/2001 |
| JP | 2002-17639 | 1/2002 |
| WO | WO 93/15245 A1 | 8/1993 |
| WO | WO 93/15247 A1 | 8/1993 |
| WO | WO 98/02300 A1 | 1/1998 |
| WO | WO 98/02610 A1 | 1/1998 |
| WO | WO 98/23199 A1 | 6/1998 |
| WO | WO 98/52458 A1 | 11/1998 |
| WO | WO 98/52459 A1 | 11/1998 |
| WO | WO 99/07273 A1 | 2/1999 |
| WO | WO 00/56828 A1 | 9/2000 |
| WO | WO 00/56830 A1 | 9/2000 |
| WO | WO 01/11004 A1 | 2/2001 |
| WO | WO 01/12052 A1 | 2/2001 |
| WO | WO 01/41622 A2 | 6/2001 |
| WO | WO 01/62132 A2 | 8/2001 |
| WO | WO 01/71081 A1 | 9/2001 |
| WO | WO 01/80705 A2 | 11/2001 |
| WO | WO 02/04548 A1 | 1/2002 |
| WO | WO 02/064360 A1 | 8/2002 |
| WO | WO 02/083834 A1 | 10/2002 |
| WO | WO 2004/060133 A1 | 7/2004 |

OTHER PUBLICATIONS

Emulsion Polymerization and Emulsion Polymers, chapter 13, p. 455 (P. Lovell and M. El-Aasser editors, John Wiley and Sons, NY, 1997).
Handbook of Pressure-Sensitive Adhesive Technology, Second Edition, chapter 16, p. 473 (D. Satas editor, Van Nostrand Reinhold, NY, 1989).

* cited by examiner

WIPE

CROSS-REFERENCE TO RELATED PATENTS

The present application is a continuation of U.S. patent application Ser. No. 10/093,792, which was filed on Mar. 8, 2002, now abandoned.

TECHNICAL FIELD

The invention relates to a wiping product that is particularly useful for capturing both ordinary dust or dirt and heavier particles such as sand.

BACKGROUND OF THE INVENTION

Cloths and other wiping products have been known for a very long time, and remarkable improvements in those products have been infrequent. Most wiping products, or wipes, are made from either a woven or nonwoven sheet, and are used either by hand or on the end of a mop handle to move dirt and dust in a desired direction. When the dirt or dust has been collected, the wipe may be scrunched up by the user to try to capture the dirt or sand that has been collected so that it can be shaken out in the trash. This simple process is repeated thousands or millions of times every day, and yet it often requires a user who is attempting to pick up larger particles such as sand to repeat the process several times to pick up all the sand or heavier particles that have been collected.

PCT Publication Number WO 01/41622, entitled "Non-apertured Cleaning Sheets Having Non-Random Macroscopic Three-Dimensional Character," discloses a cleaning sheet that has recessed and raised regions. Certain additives can be applied to the sheets to provide improved performance. Those additives, which may include things such as waxes, pest control ingredients, antimicrobials, and other ingredients, are preferably applied in a substantially uniform way to at least one discrete continuous area of the sheet. However, it is believed that the cleaning sheets described in this publication collect dust and particles on the raised portions, which can subsequently scratch the surface as a user continues to clean that surface. For example, it is believed that sand particles that are collected on the raised portions can scratch wood surfaces, which is obviously undesirable.

Another publication, Japanese Kokai Patent Application No. HEI 9-164110, discloses in general terms a cleaning cloth that includes an adhesive. In at least one embodiment, as shown in FIGS. 3(A) and 3(B), a cleaning cloth includes an adhesive layer positioned between compressible layers. In FIG. 3(A), the cleaning cloth is being used with a tool to clean a surface, and the adhesive layer is not in contact with the surface. In FIG. 3(B), pressure is applied to the tool so that the adhesive layer comes into contact with the surface, so as to pick up particles such as sand and dirt. When the pressure is released, the cleaning cloth presumably returns to the position shown in FIG. 3(A). Although cleaning cloths of this type may be useful for some applications, they appear to require a specific action of the user in order to make the adhesive effective. The adhesive does not appear to remove large particles from the floor as part of the normal floor sweeping process but rather an additional force must be applied for the adhesive to come into contact with the dust and debris. No details are provided with respect to the composition or compressive strength of the cloth, the height difference between the adhesive and the working surface of the cloth, or the adhesive types.

PCT Publication Number WO 01/80705 also describes a cleaning sheet with particle retaining cavities. The cleaning sheet is prepared by coating a nonwoven backing layer with an adhesive, followed by lamination of an apertured nonwoven onto the adhesive layer. The particle retaining cavities have a cross-sectional area of 1-10 mm and the cleaning sheets often include 0.1-5% adhesive, as a percentage of the total weight of the cleaning sheet. In another embodiment, the cleaning sheet may be formed from a single layer (i.e. no backing layer) of a slightly thicker fabric material that includes cavities in at least one of its major surfaces. It is believed that because the amount of adhesive is so small, the cleaning sheets described in this publication collect dust and particles on the raised portions, which can subsequently scratch the surface as a user continues to clean that surface. Furthermore, since the recessed cavities are discontinuous, there is no path for the dirt that is missed by the front portion of the cloth to move back through the cloth and get trapped by the rear portions of the cloth.

Another publication, Japanese Kokoku Patent Application No. 3231993, discloses a cleaning sheet that includes a base material made of a nonwoven fabric, an intermediate sheet having a pressure-sensitive adhesive coated on both sides, and a surface sheet that consists of a mesh having many apertures or holes. The apertured surface sheet is bonded to the base material via the intermediate double-sided adhesive coated sheet. The cleaning sheet has first and second areas, in which the second area has an adhesive surface that traps dirt, and the first area has a surface that is either nonadhesive or exhibits lower adhesion than the second area. The elasticity of the first area in the thickness direction is higher than that of the second area. The cleaning sheet does not have a continuous path of adhesive with which dirt particles can come into contact, and thus there is no path for the dirt that is missed by the front portion of the cleaning sheet to move back through the cleaning sheet and get trapped by the rear portions of the cleaning sheet. Another embodiment describes punching out disks or strips of a nonwoven fabric and bonding these to the intermediate adhesive sheet at specified intervals instead of using the surface mesh sheet. Although this embodiment may make more efficient use of the adhesive areas of the cleaning sheet, it is believed that this embodiment would be difficult to manufacture and may not be very durable. No details are provided with respect to the compositions of various components of the cleaning sheets, the elasticities of the first and second areas, the height difference between the adhesive and the working surface of the cloth, the adhesive types, or the performance characteristics of the cleaning sheets.

These and other known wipes seem to suffer from one or more disadvantages, and accordingly it would be useful to provide a new wipe that overcomes those disadvantages.

BRIEF DESCRIPTION OF THE DRAWINGS

The present invention will be described with respect to the appended drawings, in which.

DETAILED DESCRIPTION OF THE INVENTION

The present invention relates in general terms to a wipe that can be used to wipe up both small and large particles of dirt, sand, and other such contaminants. The wipe is three-dimensional, and thus includes peaks that are separated from each other by valleys, and in at least one embodiment adhesive is provided in the valleys. In contrast to known wipes, the adhesive is normally in contact with the surface to be wiped, and accordingly can collect both small and large particles of dirt, sand, and the like. In this way the user does not have to perform an additional step at the end of the wiping or cleaning process to bring the adhesive into contact with the dirt and sand. By proper design of the wipe, the adhesive can contact a surface sufficiently to pick up sand and other heavy particles, but not to so great a degree that the coefficient of friction between the wipe and the surface is unduly high, which can make wiping difficult. These and other beneficial features of the inventive wipe, as well as method of making and using such a wipe, will be described in greater detail below.

A. Physical Characteristics of the Wipe

Figure 1:
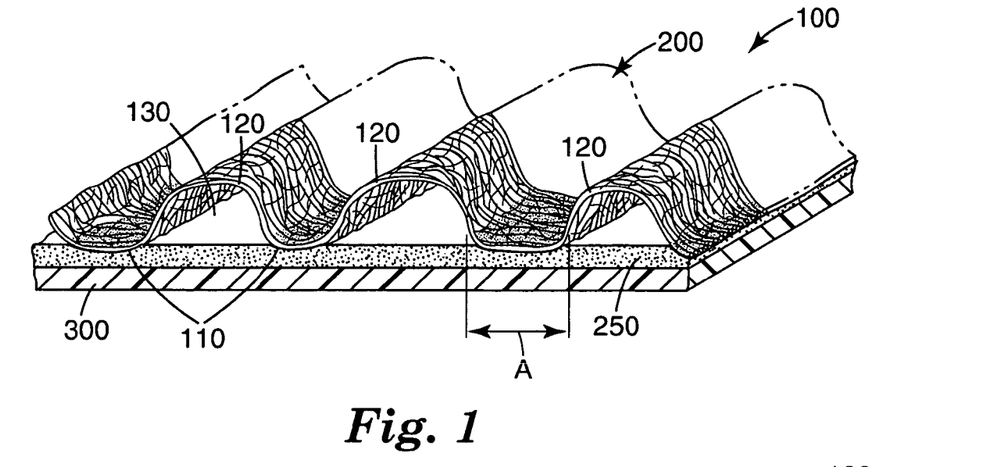
FIGS. 1 through 6 are elevated, angled side views of wipe constructions according to the present invention.

One embodiment of a wipe according to the present invention is shown in FIG. 1. The topography of the wipe is three-dimensional, and has a wiping surface that includes a number of peaks or raised regions separated by valleys. An adhesive, or a substance that has at least some adhesive characteristics such as a soft wax or a sticky gel, is provided in the valleys but not on the peaks. Alternatively, if the adhesive is initially provided over the entire wiping surface, then the adhesive on the peaks should be de-tackified by, for example, applying a substance such as titanium dioxide or calcium carbonate on the peaks of the wiping surface and perhaps a portion of the valleys.

Figure 12:
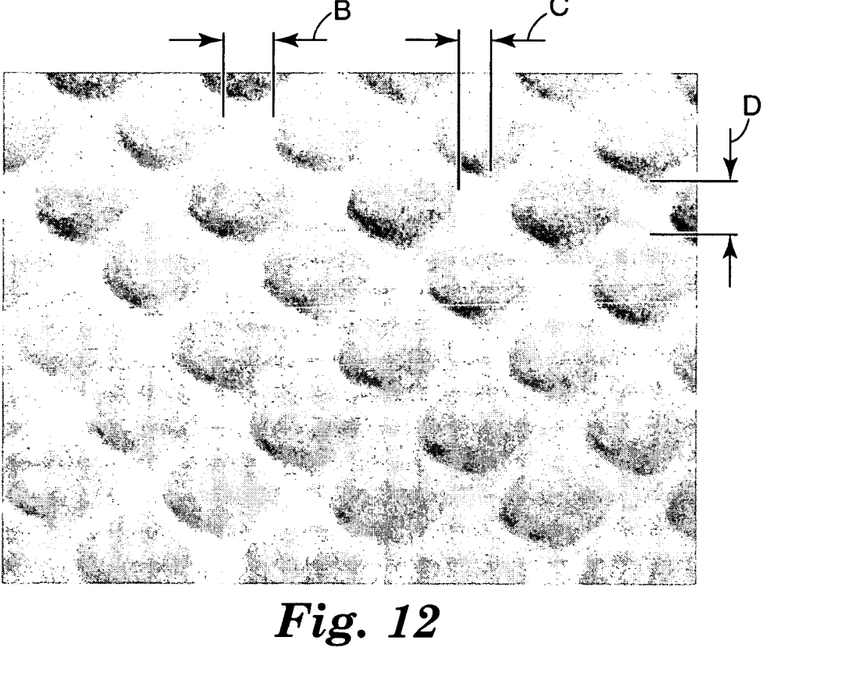
FIG. 12 is an enlarged top view photograph (approximately 2× magnification) of a wipe construction according to one embodiment of the present invention.
Figure 13:
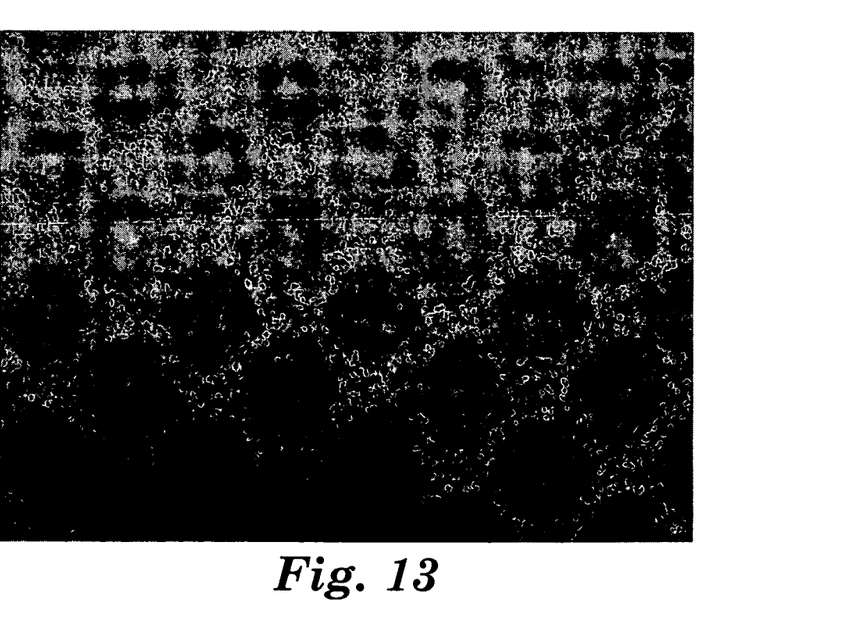
FIG. 13 is an enlarged top view photograph (approximately 2× magnification) of a wipe construction according to one embodiment of the present invention after it had been used to wipe up particles.

The peaks and valleys are preferably provided in a regular pattern or array. For example, the peaks or raised regions can be provided as generally parallel continuous rows separated by valleys such as those illustrated in FIGS. 1-8. Alternatively, the peaks or raised regions can be separated by valleys provided in a rectilinear grid, so that the raised regions are rectangular or square, or in other patterns and shapes including but not limited to diamonds (FIGS. 12 and 13), circles, ovals, triangles, tear drops, hexagons, and octagons. The peaks and valleys could be provided in what appears to be a random pattern, but because the peaks are normally formed by rollers or other devices that would periodically repeat the random pattern, this arrangement may actually be a repeating random pattern, or semi-random pattern.

The height of the peaks is generally uniform and ranges from about 0.25 millimeters (mm) to about 5 mm, preferably from about 1.5 mm to about 3.9 mm. For samples where the peaks or raised regions are separated by valleys provided in a rectilinear grid, such as the embodiments shown in FIGS. 12 and 13, the surface area of the individual peaks or raised regions ranges from about 9 mm$^2$ to about 250 mm$^2$. For corrugated samples where the peaks or raised regions are provided as generally parallel continuous rows separated by valleys, such as those illustrated in FIGS. 1-8, the surface area of the peaks or raised regions ranges from about 150 mm$^2$ to about 450 mm$^2$ (when measured for a section of a wipe having a surface area of about 645 mm$^2$).

The valleys between the peaks range from about 1 mm to about 40 mm wide. For example, distance A illustrated in FIG. 1 and distance B illustrated in FIG. 12 range from about 1 mm to about 15 mm wide. Distance C in FIG. 12 ranges from about 0.9 mm to about 4 mm wide. Distance D in FIG. 12 ranges from about 4 mm to about 40 mm wide. The dimensions of the samples were measured by optical microscopy and image analysis of the resulting micrographs.

A variety of wipe constructions are useful in the context of the present invention. In a first embodiment, which is illustrated in FIG. 1, a wipe construction 100 includes a wiping member 200 and a backing member 300, with a layer of adhesive 250 disposed between them that bonds the wiping member 200 to the backing member 300 in the valley regions 110. In areas where compressive force has been applied to the wipe (with or without heat) to form at least the valleys 110, and perhaps also the peaks 120 (if a male/female patterned roller were used, for example), the adhesive in the adhesive layer 250 permeates the valleys 110 of the first wiping member 200 and is sufficiently exposed to enable it to retain particles such as sand and dirt. Thus in those valleys, the wipe cross-section includes the first wiping member 200, the backing member 300, and the adhesive layer 250.

The wiping member 200 can be a knitted, woven, or preferably a nonwoven fibrous material. The backing member 300 can be a knitted or woven fabric, a nonwoven web, a thermoplastic film, or laminates thereof. When the backing member 300 is a nonwoven or a knitted or woven fabric it may optionally serve as a second wiping member. The wiping member 200 and the backing member 300 are preferably continuous, meaning neither the wiping member or the backing member contain holes, voids, or channels extending therethrough in the Z direction (i.e. the thickness or height dimension) that are larger than the randomly formed spaces between the fibers of the member itself when it is made. In addition, the wiping member and backing member are each preferably formed as a single unitary web or film. In the embodiment shown in FIG. 1, when the backing member 300 is a dense nonwoven or knitted or woven fabric, or a film, the particles that are wiped up can be caught and retained within chambers 130 formed between the peaks 120 and the backing member 300. This may occur because particles that stick to the adhesive areas are pushed into an adjacent chamber, or because the particles simply pass through the wiping member as they are wiped up. This occurs to some extent even when the backing member is a less dense nonwoven because of the adhesive layer 250. In any case, the ability of the wipe of this embodiment to collect particles within the open chambers is believed to be a significant advantage.

Figure 2:
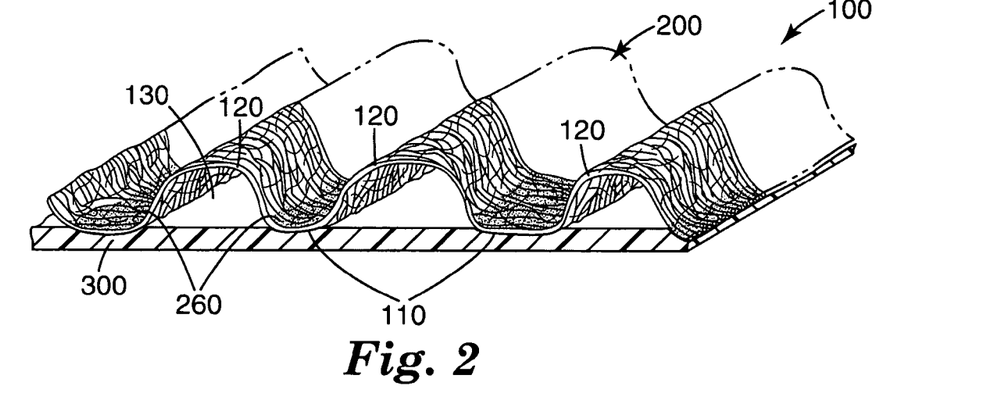
Figure 3:
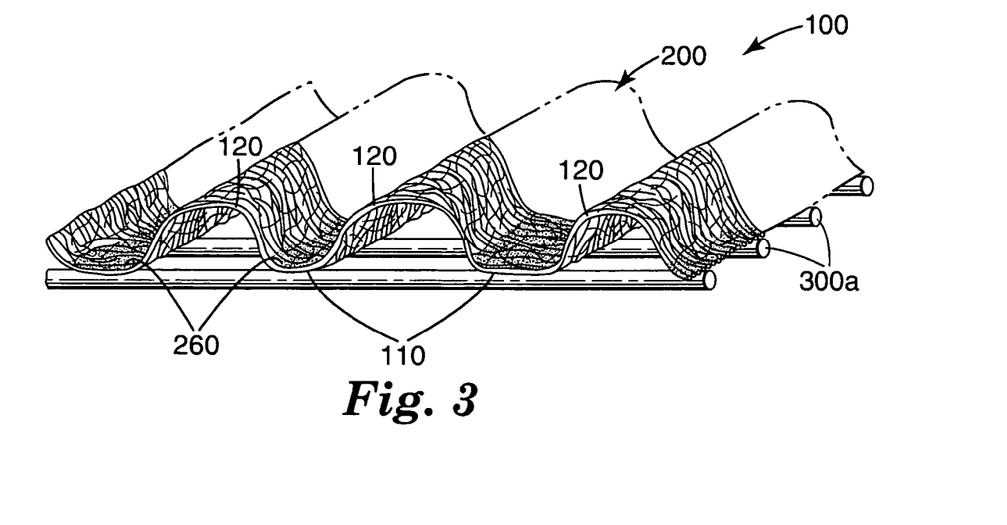

In a second embodiment, which is illustrated in FIGS. 2 and 3, the wiping member 200 and the backing member 300 and 300a are bonded together along valleys 110, and adhesive 260 is applied topically within those valleys. In this embodiment the wiping member 200 and the backing member 300 may be bonded together by an adhesive layer as illustrated and described for the embodiment in FIG. 1. Alternatively, a thermoplastic film or plurality of closely spaced filaments 300a (shown in FIG. 3) could be extrusion bonded directly onto the wiping member 200 to form the backing member 300. Another alternative would be to bond the backing member 300 to the wiping member 200 by thermal or ultrasonic bonding. Although this construction may require more expensive tooling (perhaps a specialized die to apply the adhesive in a specified pattern that matches the valleys), the resulting construction would have a large amount of adhesive available to adhere to particles of dust, sand, crumbs, and the like, and therefore may perform particularly well.

Figure 4:
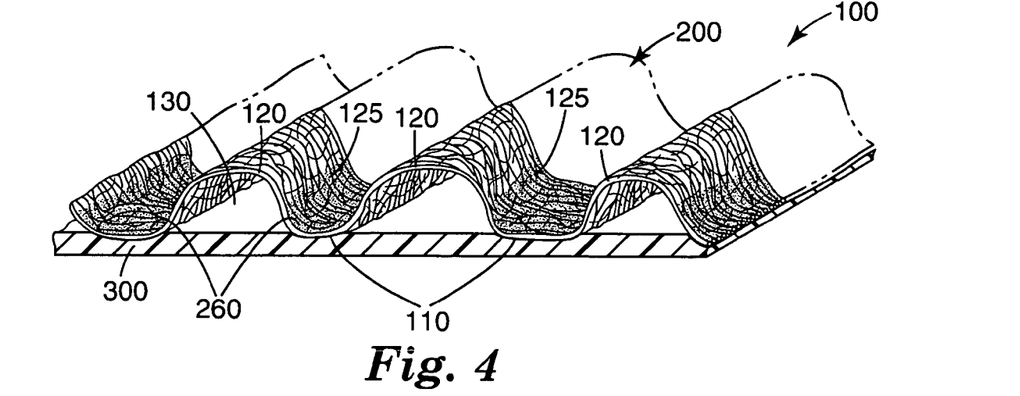

In a third embodiment, which is illustrated in FIG. 4, the wiping member 200 and the backing member 300 are also bonded together along valleys 110, and adhesive 260 is applied over substantially all of the exposed surface of the wiping member. However, a wipe having adhesive over the entire surface would be difficult to move over a surface because the adhesive would tend to cause the entire wipe to stick to the surface. Accordingly, the wipe is preferably modified by detackifying at least a portion of the wipe, and specifically the peaks 120, so that substantially only the adhesive in the valleys remains tacky and thus available to adhere to sand, dirt, and other particles. One potentially advantageous feature of this embodiment is that the adhesive 260 may remain exposed on the sides 125 of the peaks 120 in addition to being coated in the bottoms of the valleys, thus providing more surface area of adhesive available to adhere to particles of dust, sand, crumbs, and the like. Suitable detackifying agents include inorganic particulates such as titanium dioxide, calcium carbonate, silica, clay, and talc. The detackifying agents could be applied by simply setting the wipe on the detackifying agent with the adhesive exposed, so that the peaks contact the detackifying agent.

Alternative agents for selectively detackifying the adhesive on the peaks include non-tacky organic materials like mineral oil, crystalline waxes, low adhesion backsize coatings, and polyolefin polymers and copolymers, such as ethylene vinyl acetate. These materials can be applied by kiss coating using these materials as fluids, such as solutions, dispersions, emulsions, radiation curable monomers and oligomers, and hotmelts. Selective application to the peaks may also be done by spraying at a low angle, leaving the valleys in the shadow of the peaks. As an alternative to selectively detackifying the adhesive on the peaks of a wipe having adhesive coated over the entire surface of the wiping member, one can also selectively activate the adhesive that is coated in the valleys. Examples of activatable adhesives include thermally activated adhesives (see for example PCT Publication Number WO02/04548) and plasticizer activated adhesive (see for example PCT Publication Number WO00/56830) non-tacky polymers. These non-tacky polymers can be coated over the entire surface of the wipe and selectively rendered tacky in the valleys by application of heat or plasticizing fluid in these valleys. The materials may also be dropped as powders in the valleys, and once positioned, activated by the application of heat or plasticizing fluids. Alternatively, tacky polymers can be coated over the entire surface of the wipe and selectively rendered non-tacky on the peaks by radiation induced cross-linking of the adhesive.

Figure 5:
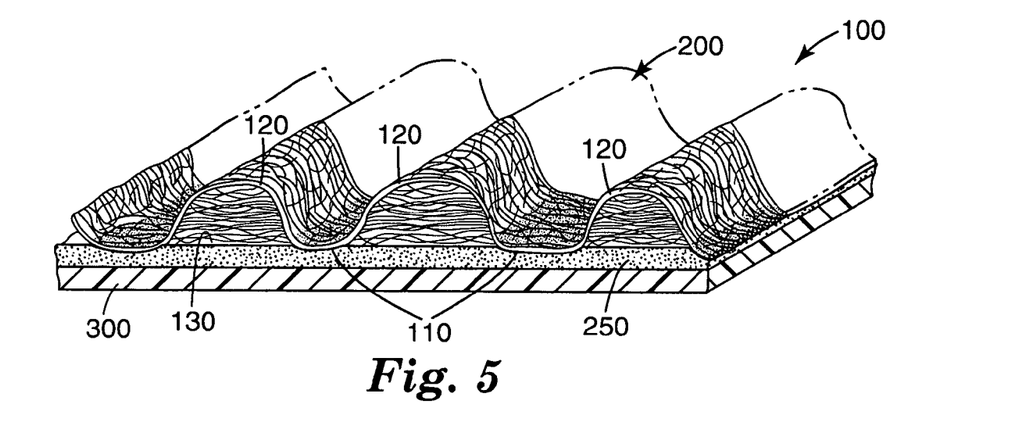

In a fourth embodiment, which is illustrated in FIG. 5, wipe construction 100 includes a wiping member 200 and a backing member 300, with a layer of adhesive 250 disposed between them that bonds the wiping member 200 to the backing member 300 in the valley regions 110. This embodiment differs from those illustrated in FIGS. 1-4 in that the chambers 130 beneath the peaks 120 contain loosely packed fibers, whereas the previous embodiments have generally open chambers. As described above for the embodiment illustrated in FIG. 1, in this embodiment adhesive permeates the first wiping member 200 sufficiently in the valleys 110 to enable it to retain particles such as sand and dirt. One advantage of this embodiment is that because the chambers 130 contain fibers, the peaks 120 are much less likely to collapse under any exerted pressure. This pressure could be, for example, the pressure exerted upon the wipe material if wound up in roll form or stacked in a package, or the pressure exerted simply by a user pushing down while wiping the surface to be cleaned. If the peaks collapse, the adhesive may not be sufficiently recessed from the surface of the wiping member and the cleaning cloth could stick to the surface being cleaned, resulting in some drag or resistance to wiping, which is undesirable.

Figure 6:
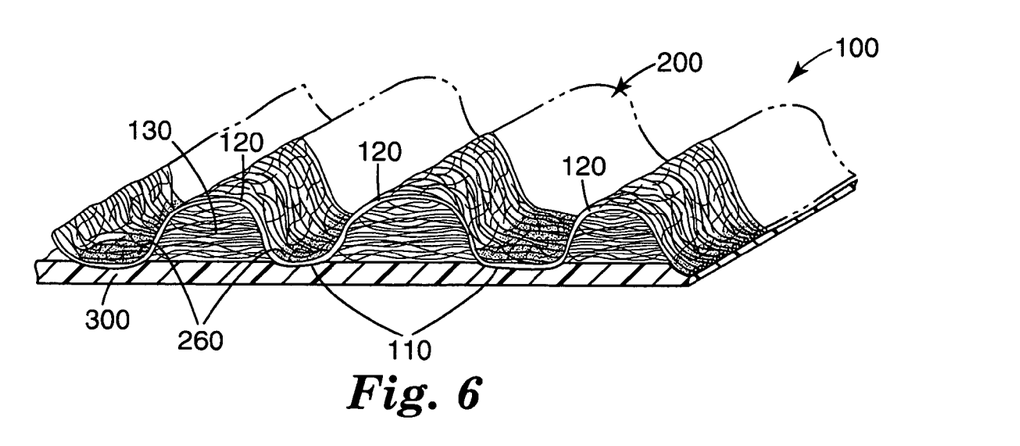

In a fifth embodiment, illustrated in FIG. 6, the wiping member 200 and the backing member 300 are bonded together along valleys 110, and adhesive 260 is applied topically within those valleys. Similar to the embodiment illustrated and described in FIG. 5, in this embodiment the chambers 130 beneath the peaks 120 contain loosely packed fibers, and therefore has the same advantageous properties described above. In this embodiment the wiping member 200 and the backing member 300 may be bonded together by an adhesive layer as illustrated and described for the embodiment in FIG. 5. Alternatively, a thermoplastic film or a plurality of closely spaced filaments (not shown) could be extrusion bonded directly onto the wiping member to form the backing member. Another alternative would be to bond the backing member to the wiping member by thermal or ultrasonic bonding. Similar to the embodiments described and illustrated in FIGS. 2 and 3, the wipe construction shown in FIG. 6 would also have a large amount of adhesive available to adhere to particles of dust, sand, crumbs, and the like, and therefore may perform particularly well.

Figure 7:
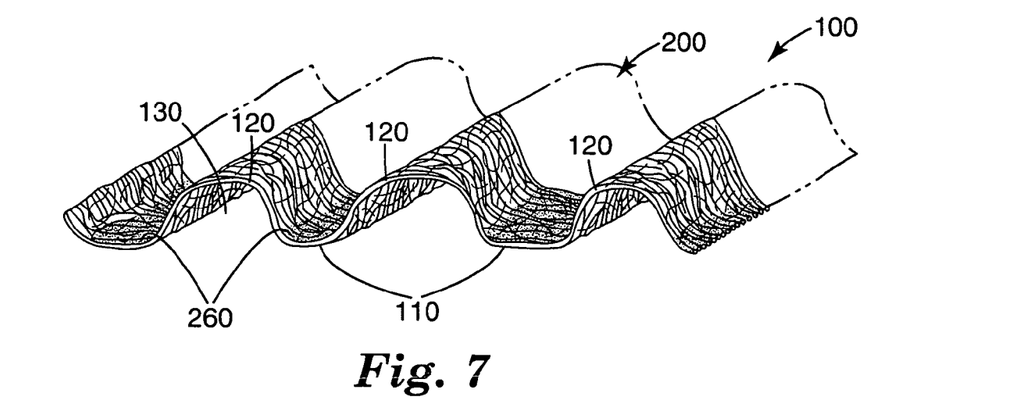
FIG. 7 and FIG. 8 are elevated, angled side views of wipe constructions according to embodiments of the present invention in which no backing member is provided.

FIG. 7 illustrates a sixth embodiment of the present invention, which is similar to the embodiment described and illustrated in FIG. 4 except that there is no backing member bonded to the wiping member 200. The formed wiping member has enough integrity to hold its shape without the need for a separate backing member. The wiping member could be formed from fibers that containing a sufficient amount of binder fibers (such as sheath-core type bicomponent binder fibers) to produce a nonwoven web with adequate structural rigidity so that a separate backing member is not required. Alternatively the wipe could be shaped by bonding a wiping member (for example, a nonwoven web of polypropylene fibers) to a structured backing member formed from a material that doesn't adhere well to the wiping member (for example, a polyester nonwoven web) under adequate heat and pressure to essentially melt a portion of the fibers in the valley or recessed regions of the nonwoven wiping member, and subsequently removing the backing from the wiping member. In this embodiment the adhesive 260 is applied topically within the valleys 110. In addition to being potentially lower in cost, another advantage of this particular wipe embodiment is that it has open chambers 130 which can subsequently be easily filled with additives such as oils, fragrant powders, soaps, detergents, and the like. A backing member could then be bonded to the wiping member to retain the additives within the cavities 130.

Figure 8:
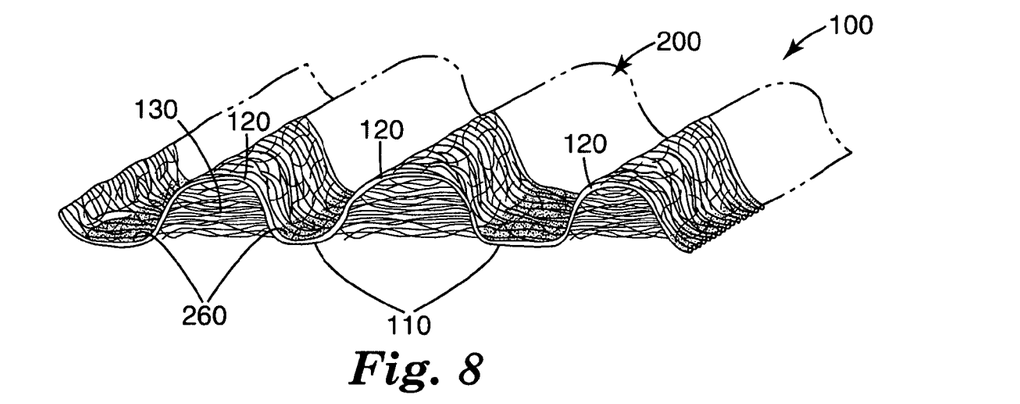

FIG. 8 illustrates a seventh embodiment of the present invention, which is similar to the embodiment described and illustrated in FIG. 6 except that there is no backing member bonded to the wiping member 200. Similar to the wipe embodiment illustrated in FIG. 7, the formed wiping member of this embodiment has enough structural rigidity to hold its shape without the need for a separate backing member.

The wiping member of the wipe construction of the present invention can be a knitted or woven fabric, or a nonwoven web. Preferably the wiping member is a nonwoven web. The nonwoven web can be prepared by any suitable melt forming or mechanical forming operation. For example, the nonwoven webs may be carded, spunbonded, spunlaced, melt blown, air laid, creped, or made by other processes as are known in the art. Preferred components for the wiping member of the present invention include nonwoven webs made from one or more of a variety of thermoplastic polymers that are known to form fibers. Suitable thermoplastic polymers can be selected from polyolefins (such as polyethylenes, polypropylenes, and polybutylenes), polyamides (such as nylon 6, nylon 6/6, and nylon 10), polyesters (such as polyethylene terephthalate), copolymers containing acrylic monomers, and blends and copolymers thereof. Semi-synthetic fibers (such as acetate fibers), natural fibers (such as cotton), regenerated fibers (such as rayon), and other non-thermoplastic fibers can also be blended with the thermoplastic fibers. The fibers typically have a denier of from about 2 to about 32, more preferably from about 5 to about 15. The basis weight of the wiping member is preferably from about 10 to about 90 grams per square meter, and more preferably from about 15 to about 60 grams per square meter.

The backing member of the wipe construction of the present invention can be a knitted or woven fabric, a nonwoven web, paper, a plastic film, or laminates thereof. The backing member may be permanently or releaseably adhered to the wiping member. When the backing member is a nonwoven web or a knitted or woven fabric it may optionally serve as a second wiping member. Preferably the backing member is a nonwoven web similar to that described above for the wiping member. The basis weight of the nonwoven backing member can be within the same ranges described above for the nonwoven wiping member, but lighter basis-weight nonwovens can permit more adhesive to penetrate through the backing member to the side opposite the wiping member, which reduces the amount of adhesive that is provided in the valleys of the wiping member to adhere to dirt and sand. Accordingly nonwovens that will be used for the backing member preferably have a basis weight of more than 15 to 20 grams per square meter.

If a plastic film is used as the backing member, a polyolefin (such as polypropylene or polyethylene), a polyamide, a polyester, or other film may be used. The thickness of the film may be from about 0.012 mm (0.5 mils) to about 0.075 mm (3 mils). If the film is extrusion bonded to a nonwoven wiping member, then it is important that the nonwoven wiping member and the film backing member be of compatible materials so that adequate bonding between the two members is obtained.

Suitable adhesives for use with the present invention include any that are capable of being tacky at room temperature, including both adhesives that are initially tacky and those that are initially non-tacky but which can be activated to become tacky. Suitable adhesives include any pressure-sensitive adhesives, including materials based on acrylates, silicones, poly-alpha-olefins, polyisobutylenes, rubber block copolymers (such as styrene/isoprene/styrene and styrene/butadiene/styrene block copolymers), styrene butadiene rubbers, synthetic isoprenes, natural rubber, and blends thereof. The pressure-sensitive adhesives may be coated from solvent, from water, radiation polymerized, or hot melt processed. These pressure-sensitive adhesives may or may not be crosslinked. Crosslinking can be done by well-known methods, including chemical, ionic, physical, or radiation-induced processes. If the adhesive is to be pushed through the wiping member, materials with low viscosity are preferred. To improve the cohesive strength of the adhesive once deposited into the valleys of the wiping member, some crosslinking may be used. To allow for low viscosity for easy processing while providing for good cohesive strength, adhesives with physical crosslinking, ionic crosslinking, or some form of post-crosslinking are preferred. Post-crosslinking can be carried out by exposing the adhesive to radiation, such as electron-beam or high intensity ultraviolet (UV) radiation. For UV crosslinking, it may be desirable to incorporate a photo-receptive group in the polymer backbone to facilitate the crosslinking reaction. U.S. Pat. No. 4,737,559 (Kellen et al.) discloses examples of such UV-crosslinked adhesives. Physical or ionic crosslinking provide the advantage that the process is thermally reversible, making it particularly preferred for hot-melt processing. Physically-crosslinked adhesives include those based on rubber block copolymers. Examples of synthetic rubber block copolymers include Kraton™ commercially available from Kraton Polymers of Houston, Tex., and Vector™ commercially available from Exxon-Mobil of Houston, Tex. These block copolymers are typically formulated into pressure sensitive adhesives by compounding them with tackifiers and/or oils. Details about the formulation of these types of adhesives can be found in the Handbook of Pressure Sensitive Adhesive Technology, Second Edition, chapter 13 (D. Satas editor, Van Nostrand Reinhold publisher, N.Y.) Other physically crosslinked adhesives include macromer grafted polymers as disclosed in U.S. Pat. No. 5,057,366 (Husman et al.).

The adhesives useful in this invention may be tacky under both dry and wet conditions. Adhesives with high tack under wet conditions are disclosed in a PCT Publication Number WO 00/56828. The pressure-sensitive adhesives may also be coated from water in the form of a latex or dispersion. As discussed in the Handbook of Pressure-Sensitive Adhesive Technology $2^{nd}$ edition (D. Satas editor, Van Nostrand Reinhold, N.Y., 1989), these adhesives may be based on polymers like natural rubber, acrylates, styrene-butadienes, and vinyl ethers. Especially when coated directly on a porous, woven, or nonwoven substrate, the neat latex adhesives may not be viscous enough to prevent excessive penetration into the substrate. Whereas the viscosity and flow of the latex adhesive may be controlled by the solids content of the material, it may be more beneficial to formulate the latex with thickening agents. Thickening agents are typically categorized as water-soluble polymers or associative thickeners. Their nature and mechanism of operation are described in Emulsion Polymerization and Emulsion Polymers, chapter 13, page 455 (P. Lovell and M. El-Aasser editors, John Wiley and Sons, NY, 1997). As discussed in the Handbook of Pressure-Sensitive Adhesive Technology $2^{nd}$ edition, chapter 16, page 473 (D. Satas editor, Van Nostrand Reinhold, N.Y., 1989), in the case of pressure-sensitive adhesives, particular care has to be taken in the selection of the thickening agent so it does not interfere with the adhesive properties.

The amount of adhesive that should be applied depends on a number of factors, including the tackiness of the adhesive, the degree to which the adhesive must be squeezed through the wiping member, the characteristics of the wiping member and the backing member (particularly in regard to the amount of adhesive that can be pushed through each member), the degree to which the adhesive adheres to surfaces (and thus makes wiping difficult), and other such factors. The amount of adhesive should be sufficient enough for the wipe to capture both small and large particles of various shapes and consistencies, such as lint, dust, hair, sand, food particles, gravel, twigs, leaves, and the like, without having excess adhesive that could create drag and make wiping difficult or that could transfer to the surface being cleaned. The adhesive may be applied as a continuous layer or as a discontinuous layer and may be applied by a variety of methods such as stripe coating, pattern coating, spray coating, screen printing, etc., as is known in the art. The wipe constructions will typically include from about 10 weight % to about 200 weight % of adhesive, more typically from about 30 weight % to about 130 weight % of adhesive, based on the weight of the input nonwoven wiping member (or the combined weight of the input nonwoven wiping member and the backing member, if a backing member is present). Also, the ratio between areas that have adhesive and those that either have no adhesive or a de-tackified adhesive can range from about 75:25 to about 20:80.

It may be useful to provide valleys (and adhesive) that extend across an entire dimension of the wiping member. For example, if a linear groove pattern is used, the grooves can extend all the way across the wiping member. The same may be true of a pattern of raised diamonds or other shapes, in which the valleys extend (though not necessarily in a straight line) across the wiping member. This provides a continuous path of adhesive with which dirt particles can come into contact, and thus the surface to be cleaned is exposed to adhesive across the entire surface of the wipe, which ensures more uniform wiping performance.

B. Methods of Making a Wipe

Figure 9:
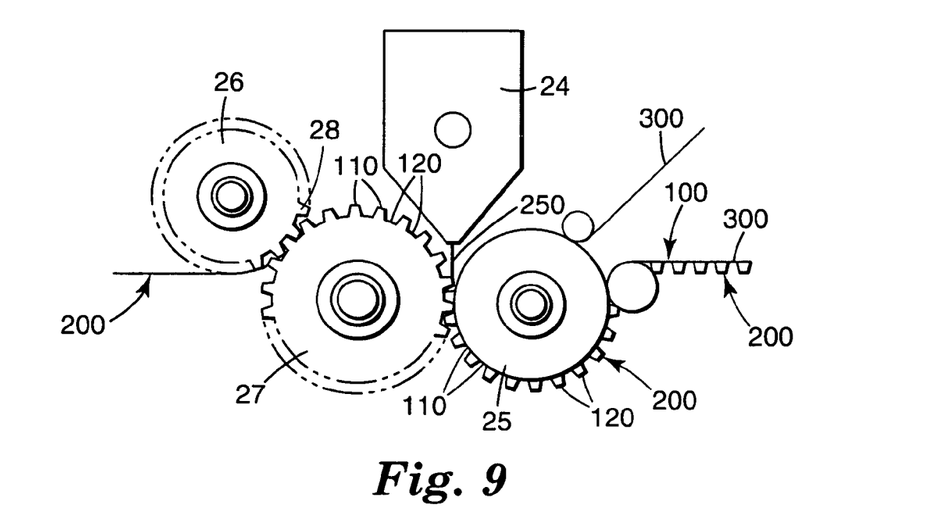
FIGS. 9 through 11 are schematic illustrations of processes for making wipe constructions according to the present invention.

There are a number of suitable ways of making a wipe in accordance with the present invention. For example, a system of the general type disclosed in U.S. Pat. Nos. 5,256,231, 5,616,394, 5,643,397, and European Patent No. EP 341993B1(all Gorman et al.), the contents of which are each incorporated by reference herein, can be used to feed together the wiping member and the backing member, apply a layer of adhesive between them, and then form them into a three-dimensional wipe of the type described. FIG. 9 schematically illustrates a method and equipment for forming a wipe of the type illustrated in FIG. 1. The method illustrated in FIG. 9 generally comprises forming a nonwoven wiping member 200 so that it has raised regions or peaks 120 and valley portions 110, extruding an adhesive layer 250 between the wiping member and a backing member 300, which bonds the valley portions 110 of the wiping member 200 to the backing member 300 to form a three-dimensional wipe 100. This method is performed by providing first and second corrugating members or rollers 26 and 27 each having an axis and including a plurality of circumferentially spaced generally axially extending ridges 28 around and defining its periphery, with spaces between the ridges 28 adapted to receive portions of the ridges 28 of the other corrugating member, 26 or 27, in meshing relationship with the nonwoven 200 between the meshed ridges 28. The corrugating members 26 and 27 are mounted in axially parallel relationship with portions of the ridges 28 meshing generally in the manner of gear teeth; at least one of the corrugating members 26 or 27 is rotated; and the nonwoven 200 is fed between the meshed portions of the ridges 28 of the corrugating members 26 and 27 to generally corrugate the nonwoven 200. The corrugated nonwoven 200 is retained along the periphery of the second corrugating member 27 after it has moved past the meshed portions of the ridges 28. An adhesive layer 250 is extruded from a die 24 into a nip formed between the second corrugating member 27 and a cooling roller 25 while simultaneously supplying a backing member 300 into the nip formed between the second corrugating member 27 and the cooling roller 25 along the surface of roller 25. This results in the extruded adhesive layer 250 being deposited between the backing member 300 and the nonwoven 200 and bonding the backing member 300 and the nonwoven 200 along the valley portions 110. Some adhesive from the surface of the backing layer is forced by nip pressure at the nip points between and through the fibers of the nonwoven web 200 due to the heat and pressure present. The nonwoven wipe laminate 100 is then carried partially around the cooling roller 25 to complete cooling.

The method used for forming a wipe of the types illustrated in FIGS. 2 and 3 is similar to and uses the same equipment illustrated in FIG. 9, except that instead of extruding an adhesive layer to bond the backing member 300 onto the nonwoven web 200, the backing member 300 or a plurality of spaced filaments 300a is formed and bonded to the nonwoven web 200 by extruding or coextruding the thermoplastic backing member 300 or 300a in a molten state from the die 24 into the nip formed between the second corrugating member 27 and the cooling roller 25. This embeds the fibers of the nonwoven web into the film or filament backing member. Adhesive 260 is then applied topically within the valleys 110 to form the wipe 100.

Alternatively, a wipe of the type illustrated in FIG. 2 could be formed by thermally or ultrasonically bonding the backing member 300 to the wiping member 200 and then topically applying adhesive 260 within the valleys 110 of the wipe 100.

Figure 10:
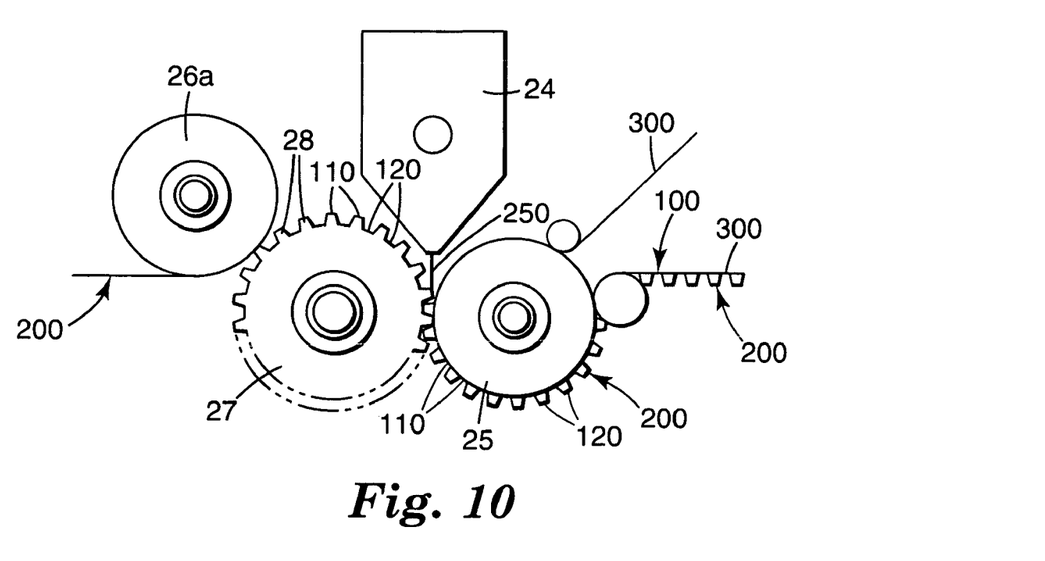

FIG. 10 schematically illustrates a method and equipment for forming a wipe of the type illustrated in FIG. 5. This method is similar to and uses the same equipment illustrated in FIG. 9, except that the first corrugating member 26a has a generally flat surface. In this wipe embodiment loosely packed fibers remain in the chambers 130 beneath the peaks 120.

The method used for forming a wipe of the type illustrated in FIG. 6 is similar to and uses the same equipment illustrated in FIG. 10, except that instead of extruding an adhesive layer to bond the backing member 300 onto the nonwoven web 200, the backing member 300 or a plurality of spaced filaments 300a is formed and bonded to the nonwoven web 200 by extruding or coextruding the thermoplastic backing member 300 or 300a in a molten state from the die 24 into the nip formed between the second corrugating member 27 and the cooling roller 25. This embeds the fibers of the nonwoven web into the film or filament backing member. Adhesive 260 is then applied topically within the valleys 110 to form the wipe 100.

Figure 11:
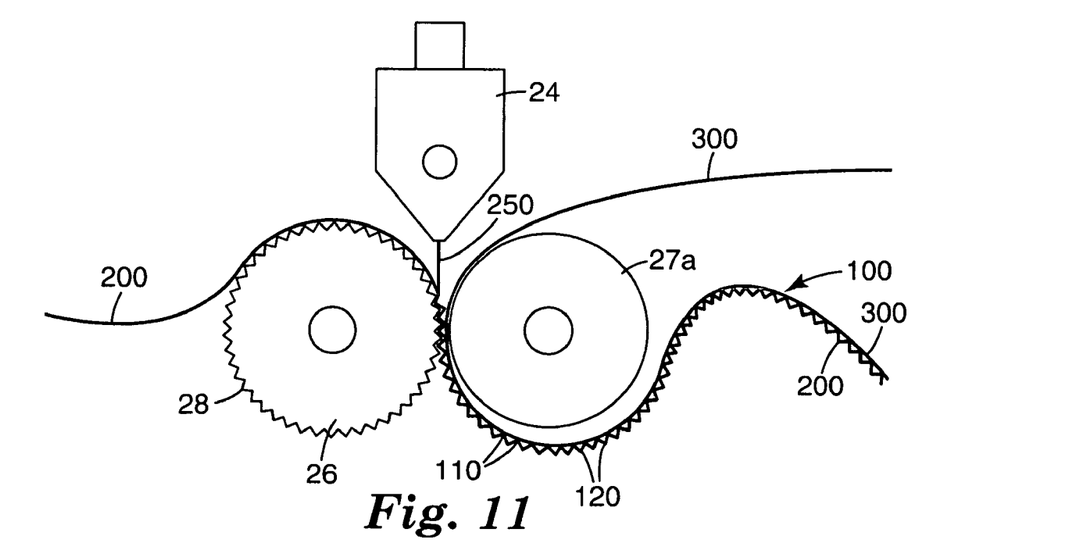

A wipe of the type illustrated in FIG. 5 can also be prepared by the method and equipment schematically illustrated in FIG. 11, which illustrates a two-roll process rather than the three-roll process as described above. This method is performed in FIG. 11 by providing first and second corrugating members or rollers, 26 and 27a having axes generally in the same plane and of about the same diameter. Corrugating member 27a has a generally flat surface. Corrugating member 26 is the recessed patterned member or roll and is generally geared to or driven by corrugating member 27a so that they move in opposite rotational directions at the same circumferential speed. The temperature of the first corrugating member 26 is generally the same as the temperature of the second corrugating member 27a, and both members are generally heated to assist in the corrugation and also the flow of the adhesive. The nonwoven wiping member 200 is carried over the surface of the corrugating roller 26 and into the nip formed between the first and second corrugating rollers. Adhesive 250 is extruded from a die 24 into the nip while simultaneously supplying a backing member 300 along the surface of the second corrugating roller 27a and into the nip. This results in an extruded adhesive layer 250 being deposited between the backing member 300 and the nonwoven wiping member 200 that bonds the backing member 300 and the nonwoven 200 along the valley portions 110. Some adhesive from the surface of the backing layer is forced by nip pressure at the nip points between and through the fibers of the nonwoven web 200 due to the heat and pressure present. The nonwoven wipe laminate 100 is then carried partially around the corrugating roller 27a to complete cooling.

A wipe of the type illustrated in FIG. 6 can also be prepared by the method and equipment similar to that schematically illustrated in FIG. 11, except that the wipe could be formed by thermally or ultrasonically bonding the backing member 300 to the wiping member 200 and then topically applying adhesive 260 within the valleys 110 of the wipe 100.

It should also be noted that the types of wipes illustrated in FIGS. 1 and 5 can alternatively be prepared by using a preformed adhesive coated backing member instead of extruding a hot melt adhesive layer in-line. This adhesive coated nonwoven backing member is then fed between the second patterned roller and the cooling roller under pressure (with or without heat) to facilitate the adhesive flow through the nonwoven wiping member into the valleys. If the backing member is releasably adhered to the wiping member, the end user could remove the backing member and attach the wipe to a cleaning implement such as to the bottom of a mop head.

The methods for forming the wipe constructions illustrated in FIGS. 7 and 8 are similar to and can use some of the same equipment as shown in FIGS. 9-11. If the nonwoven wiping member is formed from fibers that contain a sufficient amount of binder fibers (such as sheath-core type bicomponent binder fibers) to produce a nonwoven web with adequate structural rigidity, there may be no need to supply a separate backing member. Alternatively, the wipe may be shaped by bonding a nonwoven wiping member (for example, a nonwoven web of polypropylene fibers) to a structured backing member formed from a material that doesn't adhere well to the wiping member (for example, a polyester nonwoven web), under adequate heat and pressure to essentially melt a portion of the fibers in the valley or recessed regions of the nonwoven wiping member. If the backing member is then subsequently removed from the wiping member, a nonwoven web with adequate structural rigidity may be obtained. For these wipe embodiments the adhesive 260 is applied topically within the valleys 110 after the wiping member is formed.

It should be noted that two-sided wipe constructions (i.e.—wipe constructions having top and bottom wiping surfaces that include peaks or raised regions separated by valleys) could also be prepared from any of the embodiments illustrated in FIGS. 1-7. Laminating two of the wipe constructions together using various laminating means as are known in the art. Alternatively, this could be accomplished by adding additional corrugating members to the equipment illustrated in FIGS. 9-11 (See for example, U.S. Pat. No. 5,681,302, FIGS. 4 and 5 and the associated description).

C. Methods of Using the Wipe

Another way to characterize the wipe of the present invention is by the way it performs. Before turning to Examples that measure that performance, some important performance characteristics should be noted. First, the wipe should pick up sand, dirt, and other relatively large particles that are not normally picked up by a simple cloth wipe. Second, the wipe should have the proper drag when wiped across a surface. The drag associated with the wipe of the present invention is a combination of the frictional forces between the non-adhesive portions of the wipe and the surface, and the adhesive forces between the adhesive portions of the wipe and the surface. If too much adhesive is exposed, or the adhesive that is exposed is too tacky, then the wipe will catch and drag on the surface, and users will quickly become dissatisfied. If too little adhesive is exposed, or if the adhesive that is exposed is not sufficiently tacky, then the wipe probably will not retain as much dirt, sand, and the like as it should. If the height of the peaks is too high or the resistance to compression is too high then less of the adhesive will be exposed to the dirt and the wipe will not be as effective.

D. Other Features of the Invention

Additives may be added to the wipes of the present invention to provide other desirable properties. For example, detergents, abrasives, disinfectants, cleaning chemicals, polishes, oils, or waxes may be provided on or beneath the wiping member, so that those additives can act on a surface over which the wipe is moved. The fibers of the wiping member may be hydrophilic or may be hydrophilically modified (for example with a surfactant) so that both dry and damp wiping applications are possible.

It may also be desirable to color the wipe, perhaps even in a fluorescent color, and this can be done by adding a colorant to the materials used to make the wiping member, backing member, or both. It can also be done after manufacturing, perhaps by using a dye to color the wipe, although care should be exercised to insure that the dye has no harmful effect on the performance or appearance of the adhesive, and does not transfer to any surface being wiped.

The wipes of the present invention may be used alone as a dusting cloth or in combination with a cleaning implement or tool such as a mop, a glove or mitt, a duster, or a roller and the like. The wipes can also be packaged in roll form or as a stack of sheets for easy dispensing.

Test Methods

Sand Removal Test A

Sand removal was measured by distributing 2 grams (designated as $W_1$) of sand (90-175 μm mean diameter) on the surface of a 60 cm×243 cm vinyl floor. A sample of the wipe was attached to the head (wiping member facing away from the head) of a ScotchBrite™ High Performance Sweeper mop available from the Minnesota Mining and Manufacturing Company (3M Company) of St. Paul, Minn. Samples made with a liner were tested by removal of the liner and adherence of the sample to a piece of spunbond polypropylene (20 g/m², available from Avgol Ltd., Holon, Israel). The sweeper head with the wipe attached was weighed and recorded as $W_2$. The sweeper head was attached to the sweeper stick and the test sample was pushed once over the entire flooring area (i.e. one pass over every area of the flooring that sand on it) with minimal pressure applied to the handle of the sweeper mop. The head was again removed from the stick and its weight was measured ($W_3$). The weight percent of the sand removed by the wipe from the surface was calculated as follows:

$$\% \text{ Sand Removed} = [(W_3 - W_2)/W_1] \times 100$$

Sand Removal Test B

Sand removal was measured according to the Sand Removal Test A except that the wipe samples were attached to the head of a 10 cm×25 cm Pledge Grab-It™ Sweeper mop available from S.C. Johnson Inc. of Racine, Wis.

Sand Removal Test C

Sand removal was measured according to Sand Removal Test A except that sand having a larger mean diameter of 175-250 μm was used for testing.

Sand Removal Test D

Sand removal was measured according to test Sand Removal Test B except 1.54 grams of sand ($W_1$) rather than 2 grams of sand were applied on the surface of a 46 cm×243 cm vinyl floor and sand having a larger mean diameter of 175-250 μm was used for testing.

For all the sand removal tests, the data reported in the Tables are an average of at least two tests.

Drag Measurement

A Model 225-1 Friction/Peel Tester available from Thwing-Albert Instrument Company (Philadelphia, Pa.) was equipped with a force transducer (model number MB-2KG-171, also available from Thwing-Albert). The friction tester was set to a speed of 110 inch (279.4 cm) per minute and a time of 5 seconds. A piece of black glass was cut to 66.5 cm×21.5 cm and mounted on the friction tester. The glass was cleaned using Windex™ and a ScotchBrite™ Microfiber Cleaning Cloth available from 3M Company. A sample of wiping cloth was cut to 4 inch×6 inch (10.2 cm×15.2 cm) and was attached to the test fixture along the 6 inch side. Samples made with a liner were tested by removal of the liner and adherence of the sample to a piece of thermally bonded carded polypropylene web having a basis weight of 31 grams per square meter (FPN336D, available from BBA Nonwovens of Simpsonville, S.C. A 500 gram weight (7.6 cm×12.7 cm in size) was placed on the wiping cloth and the friction tester was run. The kinetic coefficient of friction (KI) was recorded. The data reported in the Tables are an average of at least two tests.

Nonwoven Materials

Nonwoven $N_1$ was a flat spunbond polypropylene nonwoven web having a basis weight of 20 grams per square meter, available from Avgol Corporation of Holon, Israel.

Nonwoven $N_2$ was a flat carded thermally bonded polypropylene nonwoven web having a basis weight of 31 grams per square meter, available as FPN 336D from BBA Nonwovens of Simpsonville, S.C.

Nonwoven $N_3$ was a flat unbonded carded nonwoven web having a basis weight of 56 grams per square meter and prepared from 9 denier polypropylene fibers, available from FiberVisions of Covington, Ga.

Nonwoven $N_4$ was a flat unbonded carded nonwoven web having a basis weight of 90 grams per square meter and prepared from 32 denier polyester fibers, available from Kosa of Charlotte, N.C.

Nonwoven $N_5$ was a spunlace polyester nonwoven web having a basis weight of 31 grams per square meter, available from Veratec Corp. of Walpole, Me.

Nonwoven $N_6$ was a flat unbonded carded nonwoven web having a basis weight of 30 grams per square meter and prepared from 9 denier polypropylene fibers, available from FiberVisions of Covington, Ga.

Nonwoven $N_7$ was a flat unbonded carded nonwoven web having a basis weight of 30 grams per square meter and prepared from an 80/20 mixture of 9 denier polypropylene fibers (available from FiberVisions of Covington, Ga.) and 1.5 denier rayon fibers available from Lenzing Fibers, Lowland Tenn.

Nonwoven $N_8$ was spunlace rayon nonwoven web having a basis weight of a 25 grams per square meter, available as S7125 from Shinwa Co, Japan.

Nonwoven $N_9$ was a flat unbonded carded web having a basis weight of 50 grams per square meter prepared from 9 denier polypropylene fibers, available from FiberVisions of Covington, Ga.

Nonwoven $N_{10}$ was a spunlace polyester nonwoven web having a basis weight of 45 grams per square meter, available from DuPont, Wilmington, Del.

EXAMPLES

Example 1

A wipe of material was prepared using the method and equipment illustrated in FIG. 9 except that the first and second intermeshing patterned rollers (corrugating members 26 and 27, respectively) that were used were machined with a diamond pattern. A wiping member (nonwoven $N_1$) was fed into the nip between first and second intermeshing patterned rollers that were machined with a diamond pattern such that there were approximately 9 diamonds per square inch (6.45 cm²) with a space between each diamond. Each diamond was machined to have a flat top-surface having a width of about 8 mm. The patterned sheet of nonwoven was shaped such that there were raised regions or peaks and anchor portions that formed valleys along the nonwoven web, each raised region or peak being about 3 mm high and each anchor portion being about 4 mm wide. The first patterned roller was heated to 93° C., whereas the second patterned roller was heated to 149° C. A hot melt adhesive commercially designated HM-1902 (available from H.B. Fuller Company of St. Paul, Minn.) was extruded through a 2 inch (5.1 cm) Davis single screw extruder onto a backing member (nonwoven $N_2$). The adhesive was extruded along the periphery of the cooling roller just prior to the nip at a die temperature of 135° C. at a basis weight of 60 grams per square meter. The formed wiping member and the adhesive coated backing member moved through the nip between the second patterned roller 27 and the cooling roller 25 (38° C.) at a pressure of about 300 pounds per linear inch. The ratio of adhesive to non-adhesive areas on the resultant wipe material was 52:48.

Example 2

Example 2 was prepared according to the procedure described for Example 1 above with the following changes. Nonwoven $N_3$ was used as the wiping member that was fed into the nip between the first and second intermeshing patterned rollers, and a smooth steel roll was used as the first roller instead of a patterned roll. Instead of extruding a hot melt adhesive layer, a pre-formed adhesive coated backing member was used and was prepared in the following manner. A hand-spread adhesive was prepared by dissolving a 60 grams sample of dry Kraton™ polymer HM-1902 (available from HB Fuller, St. Paul, Minn.) in 40 grams of toluene. The solution was agitated overnight to get a good uniform mixture. The solution was then coated onto a silicone release liner using a knife coater and was oven dried at 70° C. for 10 minutes, yielding a 3 mil (0.076 mm) thick dry adhesive coating. The sample was left overnight and was then laminated at room temperature onto a polypropylene backing member (nonwoven $N_2$) using a 4.5 pound rubber roller. The release liner was then removed. This adhesive coated nonwoven backing member was then fed between the second patterned roller and the cooling roller at a pressure of 300 pounds per linear inch.

Example 3

Example 3 was prepared using the method and equipment illustrated in FIG. 10. The procedure was similar to the procedure described in Example 1 above except that nonwoven $N_3$ was used as the wiping member, a smooth steel roll was used as the first roll instead of a patterned roll, and the HM-1902 adhesive was extruded at 113° C. at a basis weight of 29 grams per square meter.

Example 4

Example 4 was prepared according to the procedure described in Example 3 except that nonwoven $N_4$ was fed into the process, a smooth steel roll was used as the first roller, and the HM-1902 adhesive was extruded at 113° C. at a basis weight of 40 grams per square meter.

Example 5

Example 5 was prepared according to the procedure described in Example 1 except nonwoven N5 was used as the wiping member, the second patterned roller was heated to 190° C. and the cooling roll was operated at 10° C. A preformed adhesive coated backing member was used and was prepared in the following manner. A hand spread adhesive was prepared by dissolving a 60 gram sample of polymer in 40 grams of toluene. The polymer was comprised of 100 parts of Zeon Rubber 3620 (a styrene-isoprene-styrene block copolymer available from Nippon Zeon, Japan), 85 parts Wingtack® (tackifier available from Goodyear Corporation of Akron, Ohio), 1.5 parts Irganox® 1076 (antioxidant available from Ciba Specialty Chemicals of Tarrytown, N.Y.) and 1.5 parts Cyanox® LTDP (available from Cytec Industries of West Paterson, N.J.). The solution was agitated overnight to get a good uniform mixture. The solution was then coated onto a silicone release liner using a knife coater and was oven dried at 70° C. for 10 minutes, yielding a 3 mil (0.076 mm) thick dry adhesive coating. The sample was left overnight and was then laminated at room temperature onto N5 using a 4.5 pound (2.0 kilogram) rubber roller. The release liner was then removed. This adhesive coated nonwoven backing member was then fed between the second patterned roller and the cooling roller at a pressure of 250 pounds per linear inch.

Example 6

Example 6 was prepared according to the procedure described in Example 2 except that 100 parts of a hot melt acrylate copolymer having a composition of 55% 2-ethylhexyl acrylate and 45% acrylic acid were blended with 70 parts of the plasticizer UCON 50HB400 (available from Dow Chemical Company of Midland, Mich.) and this was used as the adhesive on the pre-formed adhesive coated backing member.

Example 7

Example 7 was prepared using the method and equipment illustrated in FIG. 11. A wiping member (nonwoven N6) was fed into the nip between first corrugating roller 26 (149° C.) and second corrugating roller 27a (21° C.). Adhesive HM-1902 was extruded at 190° C. at a basis weight of 60 grams per square meter onto a 1 mil (0.025 mm) polyester film backing member (available from 3M Company, St. Paul, Minn.). The wiping member and the adhesive coated backing member moved through the nip between the first corrugating roller and second corrugating roller at a pressure of 370 pounds per linear inch.

Example 8

Example 8 was prepared according to the procedure described in Example 3 above except that nonwoven $N_7$ was used, the adhesive was extruded at 190° C. at a basis weight of 60 grams per square meter, and the second patterned roller and the cooling roller (21° C.) were operated at 370 pounds per linear inch.

Comparative Example $C_1$

Comparative Example $C_1$ was a ScotchBrite™ High Performance Sweeper Disposable Cloth available from 3M Company.

Comparative Example $C_2$

Comparative Example $C_2$ was a Pledge Grab-It™ Electrostatic Cloth available from S.C. Johnson, Racine, Wis.

Comparative Example $C_3$

Comparative Example C3 was made according to PCT Publication Number WO 01/80705. Nonwoven $N_2$ was sprayed with Super 77 spray adhesive (available from 3M Company of St. Paul, Minn.) and was laminated to a sample of Comparative Example $C_2$ that had apertures cut into the cloth. The adhesive was sprayed so that the amount of dried adhesive was approximately 1.8% of the total nonwoven weight. The adhesive was allowed to dry overnight. Circles 7.5 mm in diameter were cut out of the cloth used as Comparative Example $C_2$, with 4 circles removed from each square inch of cloth. The ratio of adhesive to non-adhesive areas was 27:73.

Comparative Example $C_4$

Comparative Example $C_4$ was prepared according to Example 1 except that no adhesive was applied.

Examples 1-8 and Comparative Examples $C_1$-$C_4$ were evaluated using the Sand Removal Test Methods A, B, C, and D, and the Drag Measurement Test Method described above. The results are presented in Table I.

TABLE I

| Example | % Sand Removal (Test A) | % Sand Removal (Test B) | % Sand Removal (Test C) | Drag Measurement (KI) |
|---|---|---|---|---|
| Example 1 | 70 | — | 88 | 0.41 |
| Example 2 | 57 | — | — | 0.49 |
| Example 3 | 53 | — | 68 | — |
| Example 4 | 65 | — | — | 0.27 |
| Example 5 | 71 | — | — | — |
| Example 6 | — | — | 72 | — |
| Example 7 | — | — | 87 | — |
| Example 8 | — | — | 73 | — |
| C1 | 50 | — | 62 | 0.05 |
| C2 | — | 30 | — | 0.18 |
| C3 | — | 38 | — | — |
| C4 | 13 | — | — | — |

The performance values for Example 5 versus Comparative Example $C_4$ show that the presence of the adhesive has a significant effect. Also note that the presence of the adhesive in Comparative Example $C_3$ does not vary the performance significantly from the non-adhesive Comparative Example $C_2$.

Example 9

Example 9 was prepared in a manner similar to that described for Example 1 above. Nonwoven web $N_{10}$ was fed into the nip between first and second intermeshing patterned rollers that were machined with a diamond pattern such that there were approximately 38 diamonds per square inch with a space between each diamond. Each diamond was machined to have a flat top-surface having a width of about 4.5 mm. The patterned sheet of nonwoven was shaped such that there were raised regions or peaks and anchor portions that formed valleys along the nonwoven web, each raised region being about 1.8 mm high and each anchor portion being about 1.2 mm wide. The first patterned roller was heated to 66° C., whereas the second patterned roller was heated to 149° C. A 5 mil (0.13 mm) film of polyoctene (available from 3M Company) on a release liner was fed into the nip between the second patterned roller and the cooling roller at a pressure of 450 pounds per linear inch. The ratio of adhesive to non-adhesive areas was 43:57.

Example 10

Example 10 was prepared according to Example 9 except that the first and second intermeshing patterned rollers were run open (not touching each other). Each raised region or peak was approximately 0.25 mm high.

Example 11

Example 11 was prepared by heating flat patterned plates to 149° C. using a platen press. Nonwoven $N_9$ was placed on top of the heated patterned plate, covered with a layer of release liner and the platen press was closed for 15 seconds at 15 pounds per square inch. The textured side of the sample was then sprayed with Super 77 spray adhesive at a dry weight of 60% of the weight of the nonwoven and was placed in a 66° C. oven for 15 minutes. The peaks of the sample were detackified by masking the sample with the patterned plate and sprinkling talc onto the peaks. The excess talc was removed using a vacuum. The samples formed in this manner had raised circles with approximately 1.8 raised portions per square inch, a peak width of 15 mm, a peak height of 3.9 mm, and a distance between adjacent peaks of 9 mm. The ratio of adhesive to non-adhesive areas was 50:50.

Example 12

Example 12 was made using flat patterned plates and an iron at approximately 150° C. Nonwoven $N_8$ was used and was laminated to a 2.5 mil (0.064 mm) polypropylene film (available from the 3M Company of St. Paul, Minn.). The corrugated pattern was such that there were 16 stripes in a 100 mm×100 mm area. A solvent based pressure sensitive adhesive (iso-octylacrylate/acrylamide 96/4) was applied onto the recessed section of the corrugation pattern by transfer coating using a silicone rubber stamp. The coating weight of the adhesive was 0.6 grams per 100 mm×300 mm area. The height of the peaks was 2.1 mm, the width of the valleys was 1.0 mm, and the ratio of adhesive to non-adhesive areas was 20:80.

Comparative Example $C_6$

Comparative Example $C_6$ was formed according to Example 11 except that no adhesive was applied to the nonwoven.

Examples 9-12 and Comparative Example $C_6$ were evaluated using the Sand Removal Test Methods B and D and the Drag Measurement Test Method described above. The results are presented in Table II.

TABLE II

| Example | % Sand Removal (Test B) | % Sand Removal (Test D) | Drag Measurement (KI) |
| --- | --- | --- | --- |
| Example 9 | — | — | 0.13 |
| Example 10 | — | — | 0.71 |
| Example 11 | — | 65 | 0.84 |
| Example 12 | 69 | — | — |
| Comparative Example $C_6$ | — | 20 | 0.37 |

Comparison of performance between Example 11 and Comparative Example $C_6$ showed that the presence of the adhesive has a large effect.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A wipe for cleaning a surface comprising:
a working surface including a plurality of raised ridges and a plurality of recessed valleys wherein the valleys continuously extend from a first edge of the working surface to a second edge of the working surface and are separated from one another by the raised ridges and wherein the raised ridges continuously extend from the first edge of the working surface to the second edge of the working surface and are separated from one another by the valleys;
an adhesive at the working surface of each valley, wherein the working surface of each ridge is substantially free of adhesive.

2. The wipe of claim 1, wherein the ridges are generally linear.

3. The wipe of claim 2, wherein the ridges are generally parallel to one another.

4. The wipe of claim 1, wherein the valleys are generally linear.

5. The wipe of claim 1, wherein the valleys are generally parallel to one another.

6. The wipe of claim 1, wherein the wipe is a nonwoven.

7. The wipe of claim 1, further comprising:
a support layer secured to the wipe opposite the working surface.

8. The wipe of claim 7, wherein the support layer is a nonwoven.

9. A wipe for cleaning a surface comprising:
a single, undulating sheet including a backing surface and a working surface, wherein the working surface includes a plurality of linear raised ridges and a plurality of linear recessed valleys wherein the valleys are separated from one another by the raised ridges and wherein the raised ridges are separated from one another by the valleys;
an adhesive at the working surface of each valley, wherein the working surface of each ridge is substantially free of adhesive;
a support layer secured to the backing surface.

10. The wipe of claim 9, wherein the valleys continuously extend from a first edge of the sheet to a second edge of the sheet and wherein the raised ridges continuously extend from the first edge of the sheet to the second edge of the sheet.

* * * * *